April 22, 1952     R. E. ALLEN     2,593,716
FISHING DEVICE
Filed Nov. 7, 1950     2 SHEETS—SHEET 1
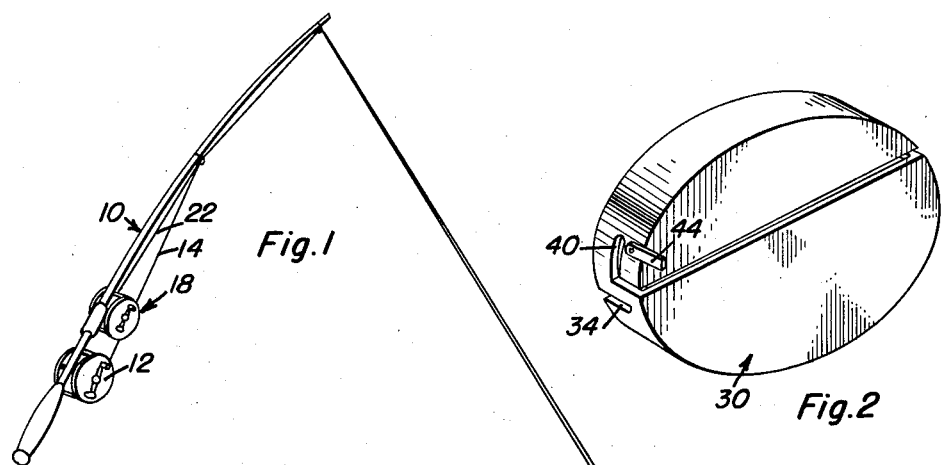
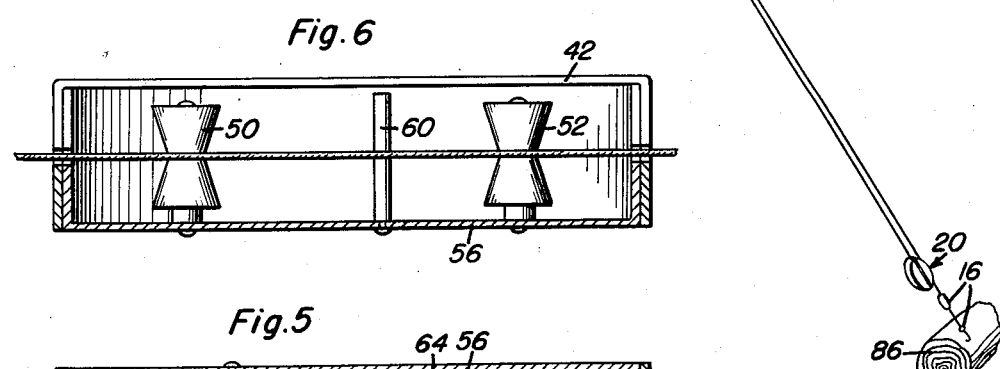
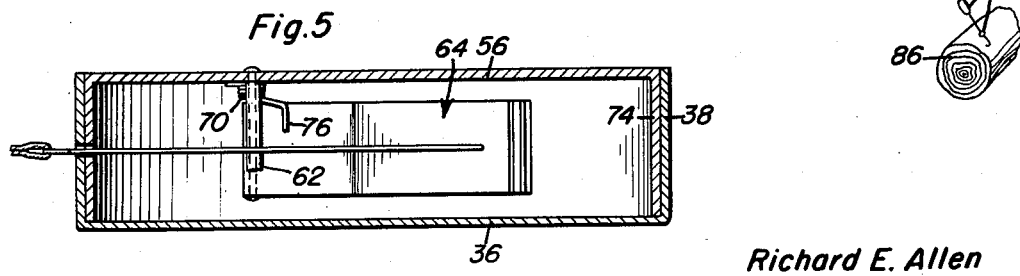
Richard E. Allen
INVENTOR.
BY *[signatures]*
Attorneys April 22, 1952     R. E. ALLEN     2,593,716
FISHING DEVICE
Filed Nov. 7, 1950     2 SHEETS—SHEET 2
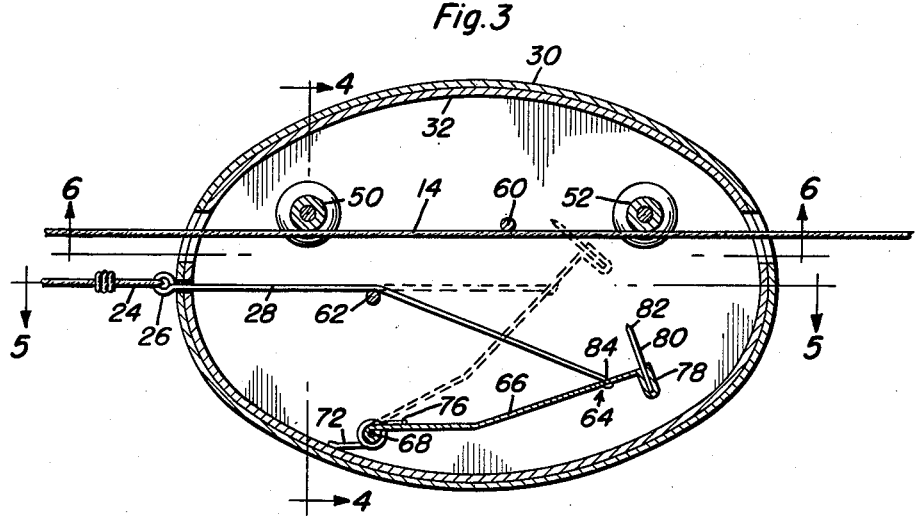
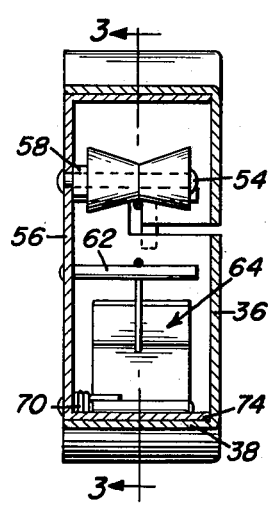
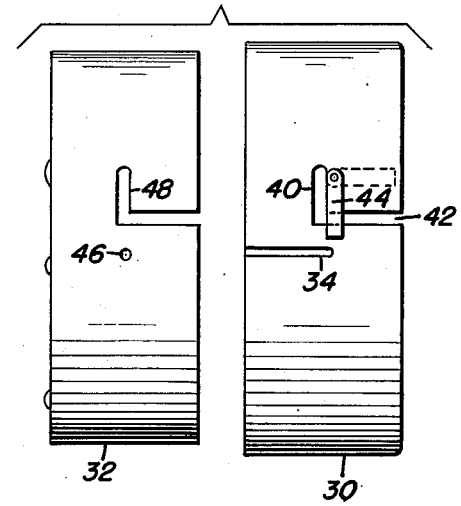
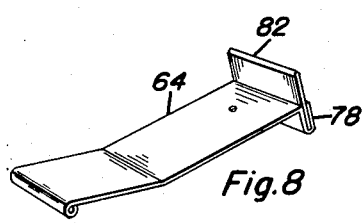
Richard E. Allen
INVENTOR.
BY *[signatures]*
Attorneys Patented Apr. 22, 1952

2,593,716

UNITED STATES PATENT OFFICE 2,593,716

FISHING DEVICE

Richard E. Allen, South Orange, N. J., assignor of one-half to John H. Bolen, Jr., Orange, N. J.

Application November 7, 1950, Serial No. 194,464

2 Claims. (Cl. 43—17.2)

1

The present invention relates to improvements in fishing equipment and more particularly to a device adapted to the positions on a fishing line that has been snagged, whereby the device may be moved to a position adjacent to the snagged hook and actuated for cutting the line, thereby saving a substantial portion of the fishing line.

An object of the present invention is to provide a fishing device which is simple in construction and readily manufactured, the device being adapted to be removably positioned on a fishing line when it is desired to cut the line at a predetermined position.

Another object of the present invention resides in the provision of a novel means whereby the cutting blade may be actuated to cut the fishing line adjacent to the snagged end.

Various other objects and advantages will become apparent from the detailed description to follow. The best form in which I have contemplated applying my invention is clearly illustrated in the accompanying drawings, wherein:

Figure 1 is a perspective view of a fishing pole and fishing line with the fishing device positioned on the fishing line which is disposed to the snagged end preparatory to cutting the fishing line;

Figure 2 is a perspective detail view of the hollow casing of the fishing device;

Figure 3 is a vertical longitudinal sectional view taken substantially along the plane of line 3—3 of Figure 4;

Figure 4 is a vertical transverse sectional view taken substantially along the plane 4—4 of Figure 3;

Figure 5 is a horizontal longitudinal sectional view taken substantially along the plane of line 5—5 of Figure 3;

Figure 6 is a horizontal longitudinal sectional view taken substantially along the plane of line 6—6 of Figure 3;

Figure 7 is an exploded view in side elevation of the casing of the fishing device; and Figure 8 is a perspective detail view of the cutting blade employed in the present invention.

Referring more particularly to the drawings, wherein like numerals designate like parts throughout, the numeral 10 designates generally a fishing pole having a conventional reel 12 and line 14 mounted thereon with a hook and sinker 16 at the other end of the fishing line 14. The numeral 18 designates generally a second reel which is employed in conjunction with the fishing device which is indicated generally by the numeral 20. The second reel 18 may be affixed

2 to the fishing pole above the first reel 12 either permanently or removably. The line 22 is wound on the reel 18 and has its end formed as a loop at 24 for connection to the eyelet 26 formed on one end of the resilient wire 28 within the fishing device 20.

The fishing device 20 is comprised of a casing formed of a first and outer cup-shaped element 30 and a second and inner cup-shaped element 32. The first element 30 is formed with a slot 34 which is vertically disposed in the wall 38 and with respect to the base wall 36. The first element 30 is also provided with an L-shaped slot 40 with one leg thereof providing a slit extending the length of the casing adjoining the L-shaped openings 40 at each end. A latch 44 is pivotally mounted on the exterior of the first element 30 for opening and closing communication with the inner leg of the L-shaped openings 40.

The second element 32 is provided with an aperture 26 which is adapted to be in alignment with the slot 34 when the first and second elements are telescoped together to provide an opening for receiving the wire 28. The second element 32 is also provided with an L-shaped slot 48 on opposite ends of the element which are adapted to be in alignment with the openings 40 in the first element 30 when the casing is in its telescoped position, as shown in Figure 4.

The interior of the housing contains a pair of rollers 50 and 52 which are rotatively disposed on pins 54 secured to the bottom rod 56 of the second element 32 with spacer washers 58 being provided to maintain the rollers 50 and 52 centrally disposed within the casing. A stop pin 60 is disposed between the pair of rollers 50 and 52 and is secured to the bottom wall 56, as seen in Figure 6. Another pin 62 is also mounted on the bottom wall 56 and is disposed in preselected relation to the aperture 46 whereby the wire 28 may pass thereover. As shown, the pin 62 lies in substantially the same plane as the aperture 46.

The cutter blade means 64 is comprised of an angulated holder element 66 which is pivotally mounted on a pin 68 secured to the wall 56 of the second element 32. A torsion spring 70 is disposed around the pin 68 and has one end 72 abutting the inner surface of the wall 74 of the second element 32 and has its other end 76 abutting the angulated element 66 thus normally urging the cutting plate 64 to the position shown in Figure 3. The outer end of the element 66 is folded at 78 for receiving a blade 80 having a sharp edge 82. The wire 28 is connected at its outermost end at 84 to the element 66.

When the fishing line 14 has become snagged on a log 86 as shown in Figure 1 or any other such means, the fishing device of the present invention is mounted on the fishing rod with the reel 18 secured to the rod 10 and the casing disposed on the fishing line so that the rollers 50 and 52 rotatively support the casing on the line. The latch 44 is moved to its closed position for maintaining the casing on the line. The line 22 of the reel 18 is unwound, permitting the casing to traverse the fishing line until it is adjacent to the sinker and severing the same. The line 22 is then given a jerk by means of the reel 18, thereby pivoting the cutter blade 64 against the line 14. The continued movement of the cutter blade 64 will cause the same to abut the stop pin 60 thereby preventing further movement.

Thus, a substantial portion of the fishing line may be saved when the hook has become snagged and the fisherman need only to replace the hook and sinker and thus to continue fishing.

From the foregoing description, taken in conjunction with the accompanying drawings, it is believed that a device has been provided which will accomplish all the objects hereinabove set forth. Of course other means than the reel 18 may be employed for use in conjunction with the fishing device of the present invention.

Having described the invention, what is claimed as new is:

1. A fishing device for cutting snagged fishing lines comprising a hollow casing having aligned openings in the end thereof through which the fishing line extends, rollers disposed in said casing for movably supporting the casing on the fishing line that has been snagged, a cutter blade means pivotably mounted within said casing, resilient means for urging the blade means to a first position, an actuating means for pivoting said blade to a second line cutting position when the device is adjacent the snagged end, said casing being provided with an aperture disposed adjacent to one of said openings, said actuating means including a line extending through said aperture, and a pin mounted in said casing, said actuating line passing over said pin and having its end secured to said cutter blade means for pivoting the same.

2. A fishing device for cutting snagged fishing lines comprising a hollow casing having aligned openings in the end thereof through which the fishing line extends, rollers disposed in said casing for movably supporting the casing on the fishing line that has been snagged, a cutter blade means pivotably mounted within said casing, resilient means for urging the blade means to a first position, an actuating means for pivoting said blade to a second line cutting position when the device is adjacent the snagged end, said casing being comprised of a pair of cup-shaped elements, one element being receivable within the other, said casing being provided with an aperture disposed adjacent to one of said openings, said actuating means including a line extending through said aperture, and a pin mounted in said casing, said actuating line passing over said pin and having its end secured to said cutter blade means for pivoting the same.

RICHARD E. ALLEN.

REFERENCES CITED

The following references are of record in the file of this patent:

UNITED STATES PATENTS

| Number | Name | Date |
|---|---|---|
| 504,203 | DeBem | Aug. 29, 1893 |
| 893,173 | Kunze | July 14, 1908 |
| 1,062,202 | Taylor | May 20, 1913 |
| 1,371,188 | Wells | Mar. 8, 1921 |
| 1,908,278 | Angell | May 9, 1933 |

FOREIGN PATENTS

| Number | Country | Date |
|---|---|---|
| 54,151 | Sweden | of 1923 |